E. T. MATTHEWS.
Improvement in Cotton-Chopper.
No. 132,015. Patented Oct. 8, 1872.
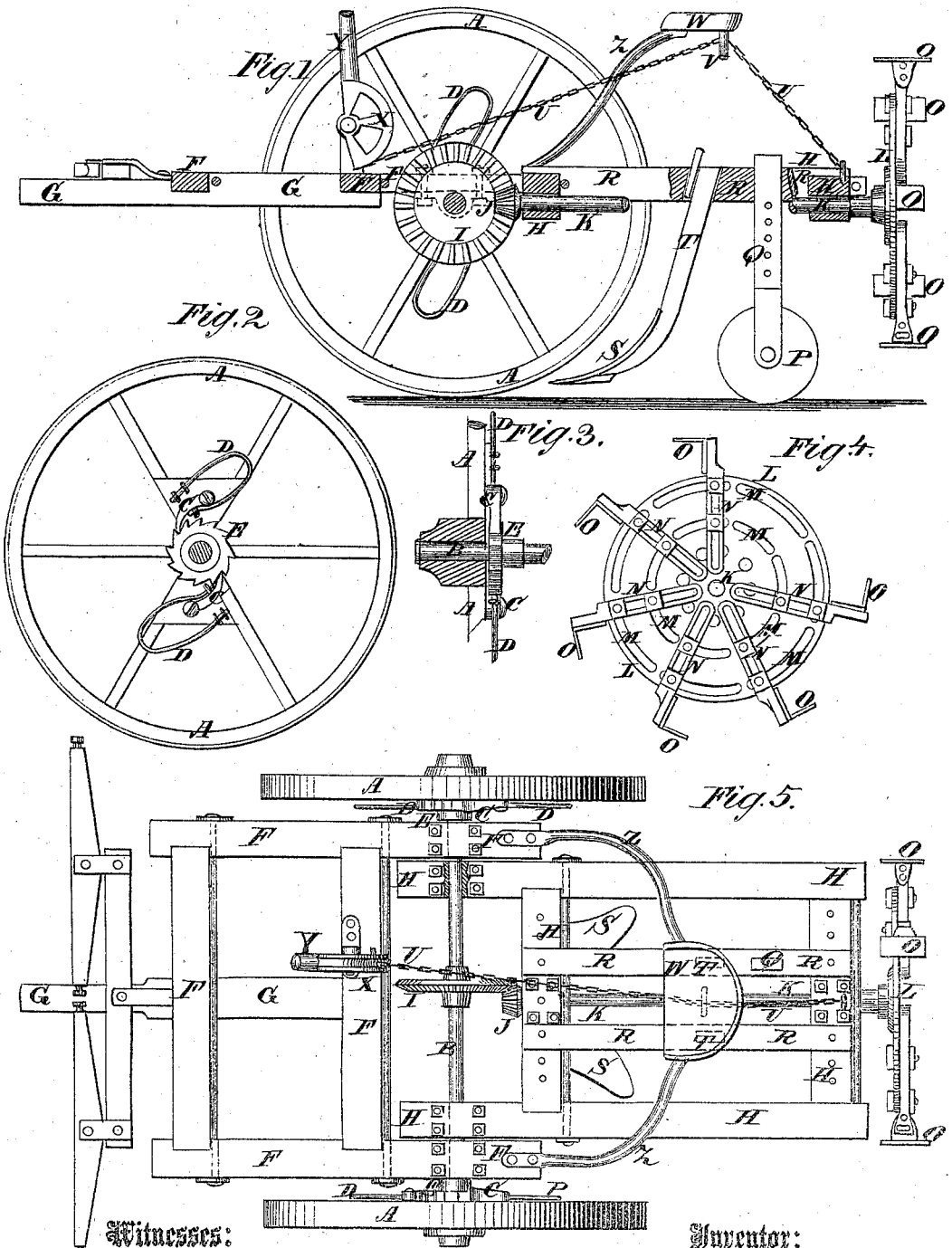

UNITED STATES PATENT OFFICE.

EBENEZER T. MATTHEWS, OF GALVESTON, TEXAS.

IMPROVEMENT IN COTTON-CHOPPERS.

Specification forming part of Letters Patent No. 132,015, dated October 8, 1872.

*To all whom it may concern:*

Be it known that I, EBENEZER T. MATTHEWS, of Galveston, in the county of Galveston and State of Texas, have invented a new and useful Improvement in Cotton-Chopper, of which the following is a specification:

Figure 1 is a detail longitudinal section of my improved machine. Fig. 2 is a detail view of one of the driving-wheels with its pawls and ratchet-wheel. Fig. 3 is a detail section of the same. Fig. 4 is a detail view of the chopping-wheel with its arms and knives. Fig. 5 is a top view of the machine.

Similar letters of reference indicate corresponding parts.

A are the drive-wheels, which revolve upon the journals of the axle B. To the wheels A are attached pawls C, held forward by the springs D against the teeth of the ratchet-wheels E, which are keyed or otherwise attached to the axle B, so that as the driving-wheels A revolve forward they may carry the axle B with them, but may revolve back without turning the said axle. F is the forward frame, to the middle part of which the tongue G is attached. The side bars of the frame F project to the rear of its rear cross-bar, and to the under sides of said projecting parts are attached bearings, in which the axle B revolves. H is the rear frame, the side bars of which project in front of its front cross-bar, and have bearings attached to their under sides, in which the axle B revolves. I is a bevel-gear wheel placed upon the axle B, and which should be connected with said axle by a tongue and groove, a clutch, or other well-known means, and should be provided with a lever, so that it may be thrown into and out of gear with the small bevel-gear wheel J when desired. The small bevel-gear wheel J is attached to the forward end of the shaft K that revolves in bearings attached to the front and rear cross-bars of the frame H. To the rearwardly-projecting end of the shaft K is attached a wheel or disk, L. In the wheel L are formed seven, more or less, sets of slots, M, which are made upon the arcs of circles having their centers at the axis of said wheel, to receive the bolts by which the arms N are adjustably secured to said wheel L. The arms N are slotted longitudinally to receive the bolts, by which they are secured to the wheel L, so that they may be conveniently set out and in, as may be required. To the forward side of the outer ends of the arms N are bolted the shanks of the bars or cutters O, the outer one of said bolts passing through a transverse slot in the said arms, so that the hoes may be conveniently adjusted, according to the position in which the frame H is supported. The rear part of the frame H is supported by the wheel P, the standard Q of which passes up through one of the plow-beams, R, to which it is secured by a pin or bolt, several holes being formed in the said standard to receive the said bolt or pin, so that the position in which the frame H is supported may be adjusted as may be required. S are the barring-off plows, the standards T of which are adjustably secured to the beams R, the ends of which rest upon and are secured to the front and rear cross-bars of the frame H by pins or bolts, which pass through the ends of the said beams and through holes in the said cross-bars, several holes being formed in the said beams to receive the said pins or bolts, so that the plows may be adjusted wider apart or closer together, as may be desired. U is a chain the rear end of which is attached to the rear end of the frame H, and which passes over a pulley, V, pivoted to the driver's seat W. The forward end of the chain U is attached to a segmental pulley or cam, X, which is pivoted to a standard or support attached to the forward frame F, and is provided with a lever, Y, formed upon or attached to it. By this arrangement, by operating the lever Y the choppers and the rear part of the rear frame will be raised from the ground for convenience in turning around or passing from place to place. The driver's seat W is supported by braces or arms Z, the lower ends of which are attached to the rear ends of the side bars of the forward frame F, and should be made of such a strength that they will support the weight of the frame and choppers when raised.

Having thus described my invention, what I claim as new, and desire to secure by Letters Patent, is—

1. The slotted wheel L, slotted arms N, and adjustable hoes or choppers O, in combination with each other and with the shaft K, by which they are driven, substantially as herein shown and described, and for the purpose set forth.

2. The combination of the wheel P and adjustable standard Q with the rear frame H and choppers L N O, substantially as herein shown and described, and for the purpose set forth.

3. The combination of the barring-plows S T and adjustable beams R with the rear frame H and adjustable regulating-wheel P Q, substantially as herein shown and described, and for the purpose set forth.

EBENEZER TORANCE MATTHEWS.

Witnesses:
W. R. YARRINGTON,
R. M. CAMPBELL.